March 8, 1966   W. E. CARTER   3,239,256
BALL JOINT CONNECTION
Filed Jan. 28, 1963

INVENTOR.
Warren E. Carter
BY Albert M. Zalkind

United States Patent Office 3,239,256
Patented Mar. 8, 1966

3,239,256
BALL JOINT CONNECTION
Warren E. Carter, Fairfield, Ill., assignor to Airtex Products, Division of United Industrial Syndicate, Inc., Fairfield, Ill., a corporation of New York
Filed Jan. 28, 1963, Ser. No. 254,355
3 Claims. (Cl. 287—87)

This invention relates to ball joints and more particularly to cartridge type ball joints used in the automotive industry in connection with steering mechanisms and the like.

The particular use of the present invention pertains to replacement of worn or defective ball joints in steering mechanisms. One of the difficulties involved in such replacement is due to the distortion or damage of the aperture in the steering link or arm or in any other component into which the ball joint is to be inserted. Thus, one form of known connection between a ball joint cartridge and a steering arm is effected by threading the body of the cartridge to cut threads or coact with threads previously formed in the arm aperture. Such threads are subject to damage which makes replacement of a new ball joint cartridge difficult. Also variation in aperture sizes of a few thousandths of an inch enlargement in threaded or force fit type connections may make replacement difficult, as well as in other types.

Among the objects of the present invention are to provide connection means for a ball joint cartridge having universal applicability and wherein such cartridge may serve as a replacement in many installations. Another object is to provide ease of installing.

Other features and objects of the invention will be apparent from the description to follow:

Briefly, the invention provides for a tapered surface on the exterior of the cartridge body which surface is longitudinally knurled. Further, the cartridge body is provided with a threaded section and a nut. Thus, the cartridge may be inserted in an aperture and, by taking up on the nut, pulled with considerable force so that the tapered knurled surface is radially compressed and strongly grips the aperture wall. The taper provides a wedging effect and the knurling prevents rotation of the cartridge after installation. The cartridge body may also be provided at its upper portion with a flat surface to take any suitable tool in order to prevent rotation of the cartridge as the nut is being taken up and is pulling the cartridge body into the aperture. While the use of a nut is preferred as a matter of convenience for inserting the cartridge body in the aperture, it will be appreciated that a force fit under pressure or hammering could also be utilized. However, the use of the nut not only makes installation convenient but also serves as an extra guard against possible loosening in the course of long and hard usage.

A detailed description of the invention now follows, in conjunction with the appended drawing in which:

FIG. 1 is an elevation partially in cross section illustrating an installation of the invention in an aperture of any mechanical component, such as a steering arm or the like;

Figure 1:
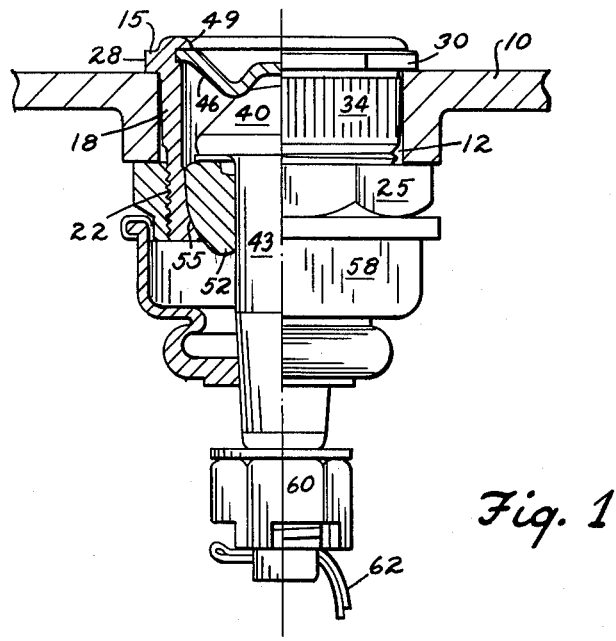
Figure 4:
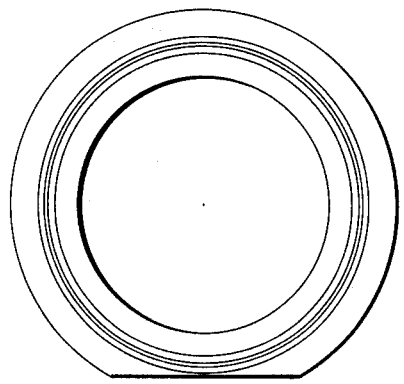
FIG. 4 is a plan view showing the flat surface at the top of the cartridge body.
Figure 2:
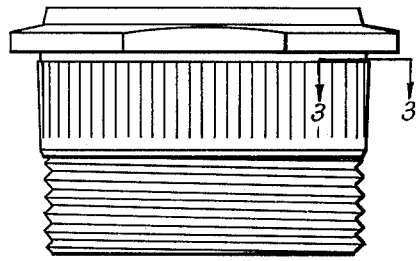
FIG. 2 is an enlarged view of the cartridge body.

Referring now to the drawing, and particularly FIG. 1, a steering arm 10 is shown provided with a cylindrical aperture 12 and which may or may not be of a threaded type (threads not shown). Socketed in the aperture is a ball joint cartridge unit which comprises a body member 15 having a tapered section 18, a threaded section 22, and a nut 25 on the threaded section. The body 15 is provided with the usual head flange 28 which seats against the arm 10 and is provided with a flat edge 30. The tapered section 18 is provided with longitudinal knurling 34. The ball joint component per se may be of generally conventional construction, such as the ball head 40 and integral shank 43; the upper seat 46 held in place by the turned in flange 49; the lower seat 52 having a spherical surface which can rock against the spherical surface 55 provided within the ball joint body; the boot seal 58 between shank 43 and the nut 25; and the fastening nut 60 and cotterpin 62, all as heretofore well-kown.

A feature resides in making the nut 25 about the same axial length as the threaded section of the body and that of the concavity 55. This longitudinally stresses such portion of the body which strengthens it against the stress of the ball element 52, and provides rigidity.

Figure 3:
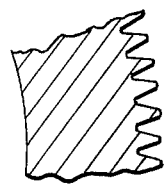
FIG. 3 is a fragmentary section through 3—3 of FIG. 2.

The knurling 34 consists of a series of ridges as shown in FIG. 3 and it has been found that the radial depth of said ridges of an order of .025″ is satisfactory although, of course, greater depths or even lesser depths are usable. Also, it has been found that straight knurling with approximately 25 teeth per inch is satisfactory, the longitudinal length of the knurled surface being from ½ to 1 inch, depending, of course, upon the size of the cartridge. The knurled surface is preferably suitably hardened so that the ridges can bite into the aperture wall.

The degree of taper may be of the order of .04 inch decreasing radius per longitudinal inch of tapered surface, being, of course, of larger diameter at the upper end. The threaded section is, of course, of lesser diameter than the minimum taper so that it may pass readily through the arm aperture and protrude sufficiently therebelow in order to start the nut thereon. Thereafter, turning of the nut will pull the cartridge body into full seating position in the aperture, the nut acting against the peripheral edge 65 of the aperture wall, as seen in FIG. 1. Rotation of the nut exerts great force to pull the knurled tapered surface into the aperture, the ridges of the knurling biting into the aperture wall, as hereinabove mentioned, or into any thread with which the aperture wall may have been provided. If there is any tendency for the cartridge body to rotate while the nut is being applied, any suitable spanner wrench may be applied to the head end of the body in engagement with the flat 30 for preventing such rotation, although ordinarily the knurled surface would resist such tendency when it initially engages the aperture wall and only unusual circumstances would require the use of a wrench.

Having thus described my invention, I am aware that various changes may be made without departing from the spirit thereof and, therefore, do not seek to be limited to the precise illustration herein given, except as set forth in the appended claims.

I claim:

1. A cartridge ball joint unit comprising a body member having a knurled tapered section on the exterior surface thereof for gripping the wall of an aperture in which said section is disposed, said body member having an interior spherical surface, a rockable ball device in said body member engaging said surface and having a shank extending thereout, and means carried by said body member to axially pull said tapered section into said aperture to effect gripping engagement thereof with said aperture wall.

2. A cartridge ball joint unit as set forth in claim 1, said means comprising a threaded section on said body member of a diameter to pass into said aperture from one side thereof and a nut for said threaded section, said body member having a flanged end, whereby said unit may be secured in said aperture by taking up on said nut against a margin of said aperture until said flanged end abuts an opposite margin thereof, said knurled tapered section having a taper of dimension suitable to tightly grip said wall of said aperture as said tapered section is pulled through said aperture, the threaded section having a length sufficient to have a portion thereof pass through the aperture and be accessible on the opposite side thereof for starting said nut thereon.

3. A cartridge ball joint unit as set forth in claim 2, said spherical surface having a longitudinal extent substantially equal to the longitudinal extent of thread thereon and said nut having substantially the same longitudinally extent whereby taking up on said nut effects longitudinal stress in said body member adjacent said spherical surface to effect rigidity thereof.

References Cited by the Examiner

UNITED STATES PATENTS

| | | | |
|---|---|---|---|
| 1,855,447 | 4/1932 | Hagstedt | 285—158 X |
| 1,996,128 | 4/1935 | Thomson | 29—525 |
| 2,019,049 | 10/1935 | Hoke | 151—41.73 X |
| 2,462,023 | 2/1949 | Johanson et al. | |
| 2,496,839 | 2/1950 | Abramoska. | |
| 2,645,510 | 7/1953 | Booth. | |
| 2,848,260 | 8/1958 | Moskovitz. | |
| 3,061,344 | 10/1962 | Gray et al. | 287—87 |

FOREIGN PATENTS

| | | |
|---|---|---|
| 311,296 | 5/1929 | Great Britain. |
| 301,309 | 11/1954 | Switzerland. |
| 312,020 | 2/1956 | Switzerland. |

CARL W. TOMLIN, *Primary Examiner.*